H. P. PALMER.
TOOL HOLDER FOR LATHES.
APPLICATION FILED AUG. 7, 1917.

1,323,092.

Patented Nov. 25, 1919.
2 SHEETS—SHEET 1.

Witness:
Jas. E. Hutchinson

Inventor:
Horace P. Palmer,
Bacon & McLane Attorneys

H. P. PALMER.
TOOL HOLDER FOR LATHES.
APPLICATION FILED AUG. 7, 1917.
1,323,092.
Patented Nov. 25, 1919.
2 SHEETS—SHEET 2.
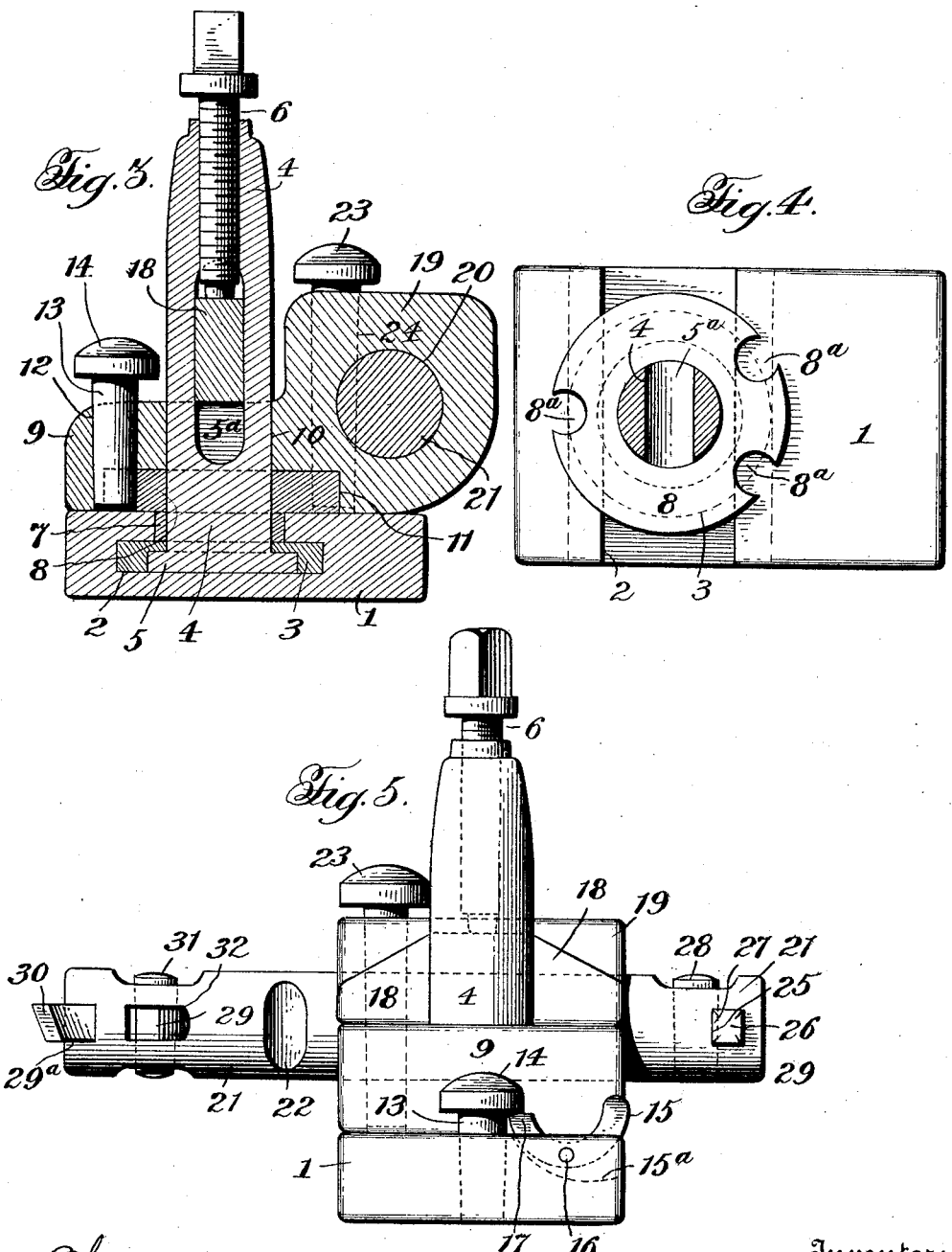

UNITED STATES PATENT OFFICE.

HORACE P. PALMER, OF MANCHESTER, GEORGIA.

TOOL-HOLDER FOR LATHES.

1,323,092. Specification of Letters Patent. Patented Nov. 25, 1919.

Application filed August 7, 1917. Serial No. 184,950.

*To all whom it may concern:*

Be it known that I, HORACE P. PALMER, citizen of the United States, residing at Manchester, in the county of Merriweather and State of Georgia, have invented certain new and useful Improvements in Tool-Holders for Lathes, of which the following is a specification, reference being had therein to the accompanying drawing.

This invention relates to tool holders for lathes, and more particularly to an attachment adapted to be applied to the ordinary tool post of standard construction.

In the art to which the invention relates, it is a recognized fact that the ordinary tool post employing the slot for the reception of the tool holder is subjected to considerable strain, and regardless of the particular type of tool holder inserted in the usual slot of the tool post, the strength of the tool holder is largely determined by the strength of the tool post at its weakest point, with the result that when the tool is used for inside work, i. e. boring etc., the tool post oftentimes becomes broken or damaged, and it is practically impossible to obtain a bore of any considerable length or depth in a structure of this character.

It is the main object of the present invention to provide a tool head with means for receiving a boring bar or tool holder, the head being adapted to be readily applied to the ordinary tool post, and rigidly supported in position, and at the same time adapted to be removed, or adjusted at will, with the result that by interchanging the tools on the tool bar, the lathe is susceptible of a variety of uses in connection with both inside and outside work.

More particularly the invention includes a tool bar holder or head adapted to have a sleeved engagement with the ordinary tool post, with means for securing the head in position whereby to constitute a rigid support for the bar when in use.

It is a further object of the invention to provide a tool head of the character described adapted to be applied to the ordinary tool post, and adapted to be readily adjusted horizontally about a vertical axis provided by the tool post, and held in adjusting position, or at different angles whereby to adapt the tool bar to various uses.

Another feature of the invention resides in the provision of novel means for retaining the tool head in adjusted positions, and associated means permitting the retaining means to be readily released.

Another important feature of the invention includes means whereby the ordinary screw threaded connections or retaining means for the various parts may be eliminated, thus overcoming the objections incident to wear, stripping of threads, etc., in the use of the retaining means of prior constructions.

A further object of the invention is to provide a tool head attachment for tool posts, simple in design and construction, involving but few parts, strong and rigid in construction, inexpensive to produce, and highly efficient and satisfactory in use.

Another feature of the invention is to do away with, so far as possible, the usual vibration and chattering incident to tool holders of ordinary construction, it being borne in mind in this connection that when the tool holder or shank is supported in the usual slot of the tool post, the tool is positioned at a point considerably removed from the supporting part of the tool post, with the result that the tool is not as rigidly supported as could be desired and there is more or less vibration of the tool, particularly when heavy work is to be encountered.

Still other and further improvements, and novel details in the construction and arrangement of the various parts of my invention will be appreciated from the description to follow, which for a clear understanding of the invention is to be considered in connection with the accompanying drawings, wherein is disclosed; for the purpose of illustration, a convenient and satisfactory embodiment of the invention.

In the drawings, Figure 1 is a top plan view of my attachment.

Fig. 3 is a vertical section substantially on the line 3—3 of Fig. 1.

Fig. 4 is a horizontal section substantially on the line 4—4 of Fig. 3, parts being shown in elevation.

Fig. 5 is a front elevation.

With more particular reference to the drawings, wherein like reference numerals refer to corresponding parts throughout the several views.

Figure 1:
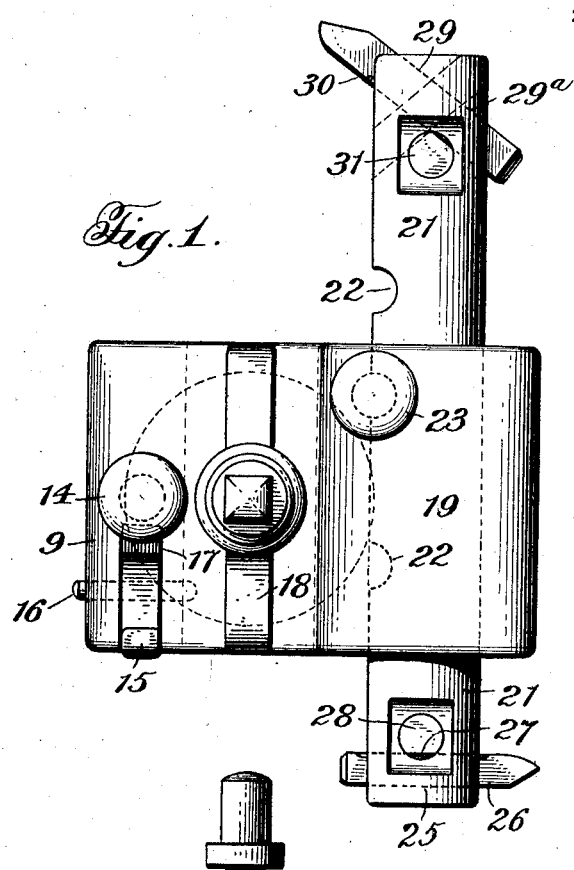
Figure 2:
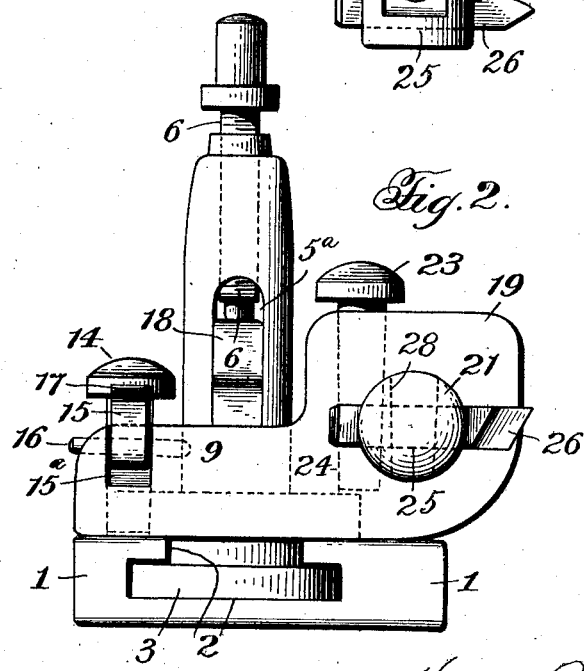
Fig. 2 is an end elevation of the attachment applied to the ordinary tool post.

(1) is the usual slide rest or base used in connection with lathes of ordinary construction, and having the ordinary inverted T-shaped slot or dove-tail groove (2) adapted for the reception of the slide block (3). The slide block has a central recess therein whereby to provide a sleeved engagement with the tool post (4) having mounted at the lower end thereof an annular enlargement or collar (5) adapted to engage within a cut-out part in the base of the slide block (2) so as to be substantially flush with the lower surface of said slide block and constituting a continuation thereof, though rotatably movable relative thereto. The tool post has the usual transverse slot or receiving opening (5ª) for the reception of the tool holder adapted to be clamped in place through the medium of the longitudinally movable bolt (6) having external threads to engage internal threads formed on the wall of the tool post surrounding the longitudinal bore thereof.

The parts just described represent what is generally known as a tool post and associated supporting parts of standard construction, and it is to a structure of this type that the present invention is particularly applicable, though it is to be borne in mind in this connection that the improved attachment may be removed at will, whereby the tool post may be adapted to ordinary uses and functions without my improved attachment.

Sleeved upon the tool post is an annular supporting and retention block (7), having a depending elongated flange (8) forming a tongue to engage between the walls of the groove (2) at the reduced upper portion thereof, said flange being adapted to rest upon the upper surface of the slide block (3). The annular supporting block (7) has a series of tapered or conical openings (8ª) therethrough conveniently at the periphery thereof, so as to slightly break the wall and provide for slight expansion of the tapered walls surrounding the openings. Any desirable number of openings (8ª) may be provided, depending upon the degree of adjustment desired, and the uses to which the tool bar is put, though I have found it convenient and highly satisfactory to employ three openings which permits of three adjustable positions for the tool head to be described, when the supporting block (8) is in one position on the tool post, and three additional adjustments when said supporting block (8) is in a reverse position on the tool post.

The tool head adapted to be applied to the supporting post includes a base or body portion proper (9) the same having a tool post receiving opening (10) connecting with an annular enlargement (11) in the base thereof, forming a receiving chamber or space for the reception of the supporting block (8) with which latter the tool head has a relative rotatable adjustment about the tool post as an axis. Projecting through the body portion (9) of the tool head is a conical aperture (12) adapted for the reception of a bolt (13), the tapered shank of which is adapted to pass through said aperture (12), and according to the angular disposition of the tool head, engage one of the openings (8ª) in the supporting or retention block (7). Conveniently the parts are so proportioned that the tapered bolt when fully seated to snugly engage the surrounding walls of the head (9) and retention block (8), the lower end of the shank of the bolt (13) will be adjacent to, or in contact with, the upper surface of the slide rest (1), whereby to prevent further downward movement of the bolt (13) under the action of a hammer or the like on the head (14) of the bolt, which might tend to unnecessarily expand or strain the parts, resulting in injury thereto. This limitation of the movement retaining bolt (13) also tends to prevent any unnecessary binding between the bolt and operatively associated surrounding walls, with the result that the bolt may be more readily detached or moved to a releasing position.

In order to assist in the release of the bolt (13) it may be desired to provide a releasing lever or the like directly upon the attachment, and to this end, I have provided a curved lever (15) arranged in a cut-out part (15ª) of the slide rest (1) and preferably mounted as by a pintle (16) whereby one end (17) thereof will engage beneath the head (14) of the bolt, whereas the opposite end is adapted to be engaged by any suitable tool as a hammer which upon giving a slight tap upon said opposite end of the lever will raise the end (17) and lift the bolt (14) into releasing position.

A filler block (18) is adapted to engage in the slot (5) between the bolt (6) and the upper surface of the body portion (9) of the head whereby to secure the head and parts associated therewith in rigid position on the slide rest (1).

The head (9) is provided with a rearward enlargement (19) having a longitudinally extending opening (20) adapted for the reception of an elongated tool bar (21), which said tool bar has in the periphery thereof longitudinally spaced transverse recesses (22) adapted to be engaged by a tapered bolt (23) to be positioned in a tapered recess (24) projecting vertically through the enlarged portion (19) of the tool head. Conveniently the tapered bolt (23) and associated parts are so proportioned that when said bolt is in snugly seated position, the lower terminal thereof will be adjacent to, or in contact with the upper surface of the slide rest (1), whereby to limit the downward movement of the bolt under the action of a driving tool, and overcome unnecessary strain on the adjacent parts, as generally understood from the above description of the construction, arrangement and operation of the retaining bolt (13). Likewise if desired the retaining bar (23) may be provided with a lifting attachment such as the lever (15) heretofore described, it being unnecessary to duplicate this part in the drawing at this position.

The plurality of the transverse recesses (22) provides for simple means of longitudinal adjustment for the tool bar, and when the retaining bolt (23) is in position, the tool bar will be positively and rigidly supported against both rotatable, longitudinal, or vibratory movement relative to the head.

The tool bar at its terminal is designed to support tools of various designs and character whereby to adapt the bar for practically all uses. Conveniently one end of the tool bar is provided with a transversely extending substantially square opening (25) adapted to receive a tool (26) conveniently designed for chasing inside and outside threads, etc. This tool conveniently has a beveled edge (27), and the tool bar has extending therethrough a tapered aperture connecting with the tool opening (25) and adapted for the reception of a tapered securing pin (28) whereby to rigidly support the tool in position.

The tool bar at its opposite end is provided with angularly disposed oppositely extending tool receiving slots (29) and (29ª) whereby to adapt the bar at this end for both inside and outside work, the tool (30) having a substantially square shank with a tapered edge and adapted to be engaged by a tapered pin or bolt (31) projecting through a tapered aperture (32) in the tool bar, the said aperture connecting with both of said tool receiving openings, whereby to engage the flared side of said tool when in position in either of the square openings provided therefor.

The peculiar retaining means for the tool on the tool bar is of particular advantage when the bar is used for boring, since the retaining bolts or pins (28) and (31) respectively may be devoid of heads or unnecessary prolongations, constituting obstructions beyond the periphery of the bar, and if desired the bar may have one or more countersunk portions to allow for a projecting end of the pins, which projection does not extend beyond the periphery of the bar at its greater diameter.

The securing pins (28) and (31) are also of especial advantage over the ordinary set screws which engage one edge of the tools, since the tools as formerly held oftentimes became loose, and because of the wear on the threads, etc., it is necessary to replace the threaded bolts or screws, or assuming that the threads of the tool bar become worn, an entirely new bar is brought into play.

The operation of the attachment may be reviewed as follows:

Assuming it is desired to utilize the lathe for boring purposes, and the bore is of considerable depth, in which event it would be impractical to utilize the tool post for supporting the tool, because of the undue strains, my attachment is readily applied by a sleeved engagement to the tool post, and assuming that the retaining bolt (13) is in released position, the tool head is swung about the post as an axis until the proper angle according to the desired work is obtained. Then the retaining bolt (13) is then engaged by a hammer or the like and forced into locking position in one of the recesses (8ª), and preferably in contact with the upper surface of the slide-rest (1). This retaining means will positively lock the head from rotatable adjustment relative to its support or retention block (7), and thereupon the threaded bolt (6) of the tool post is moved into its position against the filler block (18), whereby the head and associated parts is firmly supported upon the slide rest (1). The retaining bolt or pin (23) being in released position, the tool bar is adjusted longitudinally until the desired recess or notch (22) is brought in alinement with the retaining bolt (23) whereupon the latter is seated, through the medium of a hammer or the like, thereby rigidly securing the bar in position.

The desirable tool or tools being inserted in the end or ends of the tool bar, the tapered retaining pins (28) and (31) are set into binding engagement with the tapered wall of the recess in the bar and the flared edge of the tools whereby to rigidly support the latter in position.

It is to be borne in mind that the various retaining pins or bolts, i. e. the members 13, 23, 28 and 31, are preferably of such material having wear-resisting properties or qualities, conveniently case hardened metal, and while I have illustrated and described a means mounted directly upon the attachment for releasing the pins or bolts 13 and 23, it is to be borne in mind that an ordinary end wrench or similar tool having means to engage beneath the heads of said pins may be brought into play for releasing the same.

What I claim is:

1. An attachment for tool posts, comprising a horizontally disposed body part having a central opening therein whereby to engage over the tool post for rotatable adjustment, the wall surrounding the opening being continuous and unbroken, and an integral elongated horizontally disposed tubular part forming a tool bar receiving opening, the wall of which opening is also substantially continuous and unbroken, pin and socket means for positively locking the body part in different positions about the axis of the tool post, a tool bar projecting through said tubular part, and common pin and socket for positively locking the tool bar against rotatable and longitudinal movement.

2. A boring head attachment for tool posts comprising a body part having a vertically disposed cylindrical opening for receiving the tool post and a horizontally disposed cylindrical opening for receiving a tool bar, said body part being adapted to swing about the tool post as an axis, means for detachably securing said body part in place, a tool bar shaped to conform to the interior wall of the horizontal opening and having transverse grooves intermediate its ends and a locking pin projecting through said wall to engage either of said grooves to maintain the tool bar fixed against rotatable or lengthwise movement.

3. A boring head attachment for tool posts comprising a body part adapted to be mounted upon a tool post for adjustment and an integral tool bar support having a horizontally disposed opening the wall of which is cylindrical and unbroken, a tool bar, the body portion of which is round in cross section and has in the periphery thereof intermediate its end a plurality of transverse grooves, a locking pin tapering from end to end projecting through the tool bar support and adapted to engage any of said grooves whereby to positively lock the tool part from lengthwise and rotatable movement in said support.

4. An attachment for tool posts comprising a tool supporting member having a cylindrical opening intermediate its sides whereby to engage over the tool post and to have relative rotatable movement, a locking member to project beneath said tool supporting member, and a plurality of engaging parts to be engaged by the locking member in the different positions of the tool support relative to the tool post whereby to maintain the tool support in different rotatable adjustable positions.

5. An attachment for tool posts comprising a body part of integral construction having a central opening adapted to removably and adjustably engage over the tool post, said body part having a tool bar receiving part including an opening extending therethrough, the wall of which is continuous, a tool bar positioned in said opening, said tool bar being longitudinally adjustable relative to said opening and means for positively securing the same in adjusted position, said means including a tapered bolt adapted to engage coöperating recesses in the tool bar receiving part and the tool bar.

6. An attachment for tool posts comprising a member adapted to be removably positioned on the tool post and having an integral horizontally disposed unbroken extension forming a tool bar receiving opening, a tool bar positioned in said opening, the walls surrounding said opening and the tool bar being provided with transverse recesses, and a tapered bolt common to and adapted to engage on one of said coöperating recessed portions to rigidly support the bar in adjusted horizontal positions, said bolt terminating in a headed end.

7. In a device of the character described, the combination of a supporting bed having a transverse groove, a tool post mounted for slidable movement in said groove, a member connected to the tool post for slidable movement therewith, a tool bar support comprising a body part with a central opening sleeved upon the tool post for rotatable adjustment, means for locking said body part to said member in its different positions of adjustment, and said body part having an integral horizontally disposed elongated tubular extension forming a tool bar support.

8. An attachment for tool posts comprising a tool bar supported member, a tool bar positioned on said member, and having a plurality of angularly disposed openings therethrough at one end thereof for the reception of tools, said tool bar also having a transversely extending opening in communication with both the said tool receiving openings, and a tapered pin adapted to engage in said tapered opening to removably secure a tool in either of said angularly disposed openings.

9. A removable tool bar attachment for tool posts comprising a head having means for supporting a tool bar, said head having a sleeved engagement with the tool post, whereby to be rotatably adjusted about the tool post as an axis, and means for retaining said head in adjusted positions, said means including a member having a series of circumferentially spaced openings, and a tapered bolt positioned in a tapered opening in the head and adapted to engage anyone of said circumferentially spaced openings.

10. A removable attachment for tool posts having a slide rest and tool post positioned thereon, a member positioned on said rest and having circumferentially spaced openings therein, a head sleeved upon the tool post for rotatable adjustment, and a tapered bolt mounted on the head and adapted to engage one of the openings to retain the head in adjusted position.

11. In combination with a tool post having the usual slide rest with a groove in the upper surface thereof, a slide block in said groove and a tool post projecting upwardly from the slide block, of a tool head having a sleeved engagement with the tool post for rotatable adjustment, a member having a tongue set in said groove of the slide rest, and having a tapered opening therein, and a tapered pin on the head to engage said tapered opening to secure the head in position.

12. In combination with a tool post having the usual slide rest with a groove in the upper surface thereof, a slide block in said groove and a tool post projecting upwardly from the slide block, of a tool head having a sleeved engagement with the tool post for rotatable adjustment, a member having a tongue set in said groove of the slide rest, and having a tapered opening therein, and a tapered pin on the head to engage said tapered opening to secure the head in position, and means on the head for releasing said pin.

13. In a lathe attachment, the combination of a slide rest having grooves in the upper surface thereof, a tool post positioned in said groove and projecting upwardly therefrom, a tool bar support having a sleeved engagement with the tool post, said support having a vertical opening therethrough, a member interposed between the tool bar support and the slide rest and having a tongue projection positioned in said groove, said member having tapered openings therein, and a tapered bolt positioned in the vertical opening of the tool bar support and adapted to removably engage the tapered opening of said member.

14. A lathe attachment comprising a slide rest having a groove in the upper surface thereof, a tool post having a part positioned in said groove, said tool post having a transversely extending opening and a longitudinally adjustable bolt in the upper end thereof connecting with said opening, a tool bar head having a horizontally disposed opening, a tool bar positioned in said opening, said head having also a vertically disposed opening sleeved upon the tool post, said head being mounted for rotatable adjustment, means interposed between the head and slide rest for supporting the head in adjusted position, and filler block interposed in said slot in the tool post between said head and the lengthwise adjustable bolt for retaining the head in place.

15. A removable tool bar attachment for tool posts, comprising a head having means for supporting a tool bar, said head having a sleeved engagement with the tool post, whereby to be rotatably adjusted about the tool post as an axis, and means for retaining said head in adjusted position, said means including a part having a plurality of circumferentially disposed engaging parts, and a member positioned on the head adapted to engage any one of the engaging parts.

16. An attachment for tool posts comprising a member having a central opening the wall of which is continuous, the part being mounted for rotatable adjustment about a tool post, said member having an integral horizontally disposed cylindrical part with a longitudinal opening, a tool bar loosely positioned in said opening for rotatable and lengthwise adjustment, said bar having spaced transverse grooves therein, and a locking pin to engage in one of said grooves to positively lock the tool bar on the adjustable member and against relative rotatable and lengthwise movement.

17. An attachment for tool posts comprising a tool bar support having a cylindrical opening the wall of which is continuous and unbroken, a tool bar positioned in said opening, means for supporting the same in place, said tool bar having adjacent one end thereof a transverse opening therethrough, a cutting tool positioned in said opening, a transversely disposed locking pin projecting through the tool bar, and one of the parts comprising the cutter and locking pin having an inclined engaging face whereby the cutter is locked in position by a wedging connection, substantially as and for the purpose described.

In testimony whereof I hereunto affix my signature in the presence of two witnesses.

HORACE P. PALMER.

Witnesses:
NATE E. CAFFERTY,
ROBERT A. KELLEY.